US012762681B2

(12) United States Patent
Tomita et al.

(10) Patent No.: US 12,762,681 B2
(45) Date of Patent: Oct. 13, 2026

(54) MEASURING METHOD INCLUDING MEASURING AN AMOUNT OF PROTRUSION PROTRUDING FROM A SIDE SURFACE OF A LOWER PORTION AND MEASURING DEVICE HAVING THE SAME

(71) Applicant: Magnolia White Corporation, Tokyo (JP)

(72) Inventors: Satoru Tomita, Tokyo (JP); Kazuyuki Endou, Tokyo (JP); Kota Makishi, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 418 days.

(21) Appl. No.: 18/484,453

(22) Filed: Oct. 11, 2023

(65) Prior Publication Data

US 2024/0127419 A1 Apr. 18, 2024

(30) Foreign Application Priority Data

Oct. 12, 2022 (JP) ................................ 2022-164001

(51) Int. Cl.

| | |
|---|---|
| ***G06T 7/00*** | (2017.01) |
| ***G01N 23/04*** | (2018.01) |
| ***G01N 23/083*** | (2018.01) |

(52) U.S. Cl.

CPC .......... *G06T 7/0004* (2013.01); *G01N 23/04* (2013.01); *G01N 23/083* (2013.01); *G06T 2207/10116* (2013.01); *G06T 2207/20081* (2013.01); *G06T 2207/30108* (2013.01)

(58) Field of Classification Search

CPC ......... G06T 7/0004; G06T 2207/10116; G06T 2207/20081; G01N 23/04; G01N 23/083; G08T 2207/30108

USPC .......................................................... 438/14

See application file for complete search history.

(56) References Cited

U.S. PATENT DOCUMENTS

| | | | | |
|---|---|---|---|---|
| 12,108,631 | B2 * | 10/2024 | Takayama | H10K 59/122 |
| 2004/0160170 | A1 | 8/2004 | Sato et al. | |
| 2009/0009069 | A1 | 1/2009 | Takata | |
| 2018/0284038 | A1 * | 10/2018 | Shinomiya | B25J 15/0019 |

(Continued)

FOREIGN PATENT DOCUMENTS

| | | | |
|---|---|---|---|
| JP | H11190609 | A | 7/1999 |
| JP | 2000-195677 | A | 7/2000 |

(Continued)

OTHER PUBLICATIONS

Japanese Office Action issued Mar. 3, 2026, in JP Application No. 2022-164001, 6pp.

*Primary Examiner* — Phuc T Dang

(74) *Attorney, Agent, or Firm* — XSENSUS LLP

(57) ABSTRACT

According to one embodiment, a measuring method includes forming a partition including a lower portion arranged on a first surface side of a base and an upper portion protruding from a side surface of the lower portion, acquiring a first image including the partition, which is generated by emitting electromagnetic waves from the first surface side of the base or a second surface side opposed to the first surface of the base, analyzing the acquired first image, and measuring an amount of protrusion at which the end portion of the upper portion protrudes from the side surface of the lower portion, based on the analysis result.

20 Claims, 12 Drawing Sheets

(56) References Cited

U.S. PATENT DOCUMENTS

| | | | | |
|---|---|---|---|---|
| 2019/0363275 | A1 | 11/2019 | Ochi et al. | |
| 2022/0077251 | A1 | 3/2022 | Choung et al. | |
| 2022/0171078 | A1* | 6/2022 | Nakamura | G01T 1/2002 |

FOREIGN PATENT DOCUMENTS

| | | | | |
|---|---|---|---|---|
| JP | 2004-207217 | A | 7/2004 | |
| JP | 2008-135325 | A | 6/2008 | |
| JP | 2009-032673 | A | 2/2009 | |
| JP | 2010-118191 | A | 5/2010 | |
| JP | 2013-213733 | A | 10/2013 | |
| WO | WO-2005040773 | A1 * | 5/2005 | G01N 21/95692 |
| WO | 2018/179308 | | 10/2018 | |

* cited by examiner

MEASURING METHOD INCLUDING MEASURING AN AMOUNT OF PROTRUSION PROTRUDING FROM A SIDE SURFACE OF A LOWER PORTION AND MEASURING DEVICE HAVING THE SAME

CROSS-REFERENCE TO RELATED APPLICATIONS

This application is based upon and claims the benefit of priority from Japanese Patent Application No. 2022-164001, filed Oct. 12, 2022, the entire contents of which are incorporated herein by reference.

FIELD

Embodiments described herein relate generally to a measuring method and a measuring device.

BACKGROUND

Recently, display devices with organic light-emitting diodes (OLED) applied thereto as display elements have been put into practical use.

However, if the display devices are not manufactured appropriately, reliability of the display devices may be reduced. Therefore, a technique of suppressing the reduction in reliability of the display devices has been required in a process of manufacturing the display devices.

DETAILED DESCRIPTION

Figure 1:
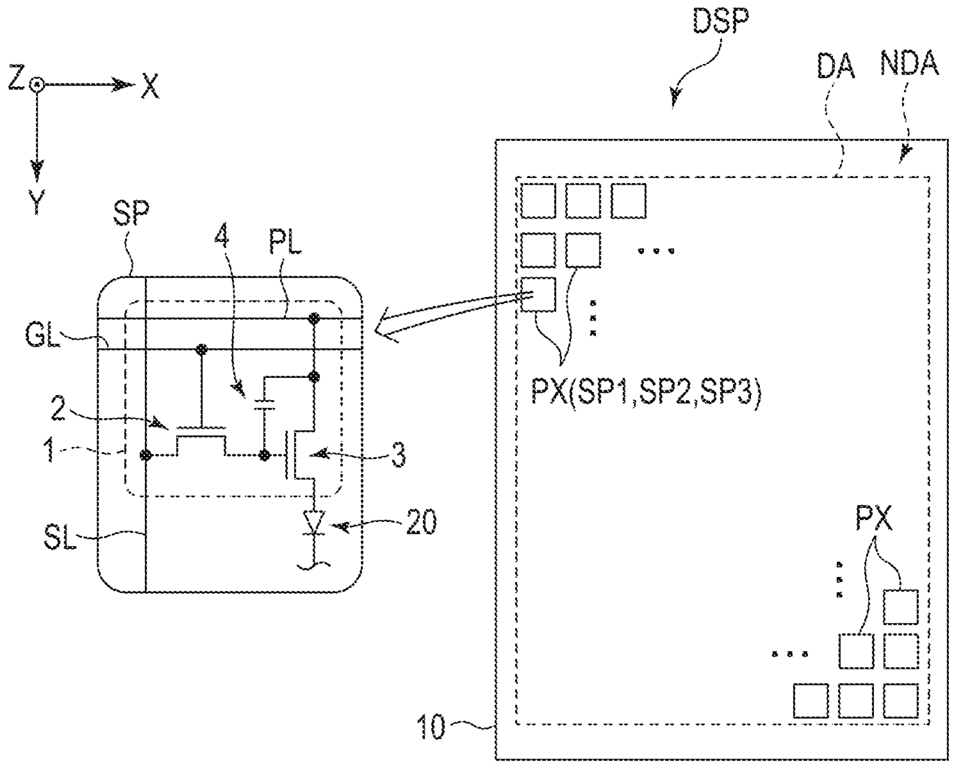
FIG. 1 is a view showing a configuration example of a display device according to an embodiment.

In general, according to one embodiment, a measuring method includes forming a partition including a lower portion arranged on a first surface side of a base and an upper portion protruding from a side surface of the lower portion, acquiring a first image including the partition, which is generated by emitting electromagnetic waves from the first surface side of the base or a second surface side opposed to the first surface of the base, analyzing the acquired first image, and measuring an amount of protrusion at which the end portion of the upper portion protrudes from the side surface of the lower portion, based on the analysis result.

An embodiment will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as a direction X, a direction along the Y-axis is referred to as a direction Y, and a direction along the Z-axis is referred to as a direction Z. In addition, viewing various elements parallel to the direction Z is referred to as plan view.

The display device of the embodiment is an organic electroluminescent display device including an organic light emitting diode (OLED) as a display element, and can be mounted on televisions, personal computers, vehicle-mounted devices, tablet terminals, smartphones, cell phone terminals, and the like.

FIG. 1 is a view showing a configuration example of a display device DSP according to the embodiment. The display device DSP has a display area DA where images are displayed and a non-display area NDA around the display area DA, on an insulating base 10. The base 10 may be glass or a flexible resin film.

In the embodiment, the shape of the base 10 in plan view is a rectangular shape. However, the shape of the base 10 in plan view is not limited to a rectangular shape, but may be any other shape such as a square, a circle or an ellipse.

The display area DA includes a plurality of pixels PX arrayed in a matrix in the first direction X and the second direction Y. Each of the pixels PX includes a plurality of sub-pixels SP. As an example, the pixel PX includes a red sub-pixel SP1, a green sub-pixel SP2, and a blue sub-pixel SP3. The pixel PX may include a sub-pixel SP of the other color such as white, together with the sub-pixels SP1, SP2, and SP3. In addition, the pixel PX may include a sub-pixel SP of the other color instead of any one of the sub-pixels SP1, SP2, and SP3.

The sub-pixel SP includes a pixel circuit 1 and a display element 20 driven by the pixel circuit 1. The pixel circuit 1 includes a pixel switch 2, a drive transistor 3, and a capacitor 4. The pixel switch 2 and the drive transistor 3 are, for example, switching elements constituted by thin-film transistors.

A gate electrode of the pixel switch 2 is connected to a scanning line GL. One of a source electrode and a drain electrode of the pixel switch 2 is connected to a signal line SL, and the other is connected to a gate electrode of the drive transistor 3 and the capacitor 4. In the drive transistor 3, one of the source electrode and the drain electrode is connected to the power line PL and the capacitor 4, and the other is connected to the display element 20.

The configuration of the pixel circuit 1 is not limited to the example shown in FIG. 1. For example, the pixel circuit 1 may include more thin-film transistors and more capacitors.

The display element 20 is an organic light emitting diode (OLED) serving as a light emitting element. For example, the sub-pixel SP1 includes a display element 20 that emits light of a red wavelength range, the sub-pixel SP2 includes a display element 20 that emits light of a green wavelength range, and the sub-pixel SP3 includes a display element 20 that emits light of a blue wavelength range.

FIG. 1 mainly shows a display panel used for manufacturing the display device DSP, and the display device DSP has a structure in which a circuit board including a driver (driver IC chip) which drives the display panel and the like is connected to the display panel.

Figure 2:
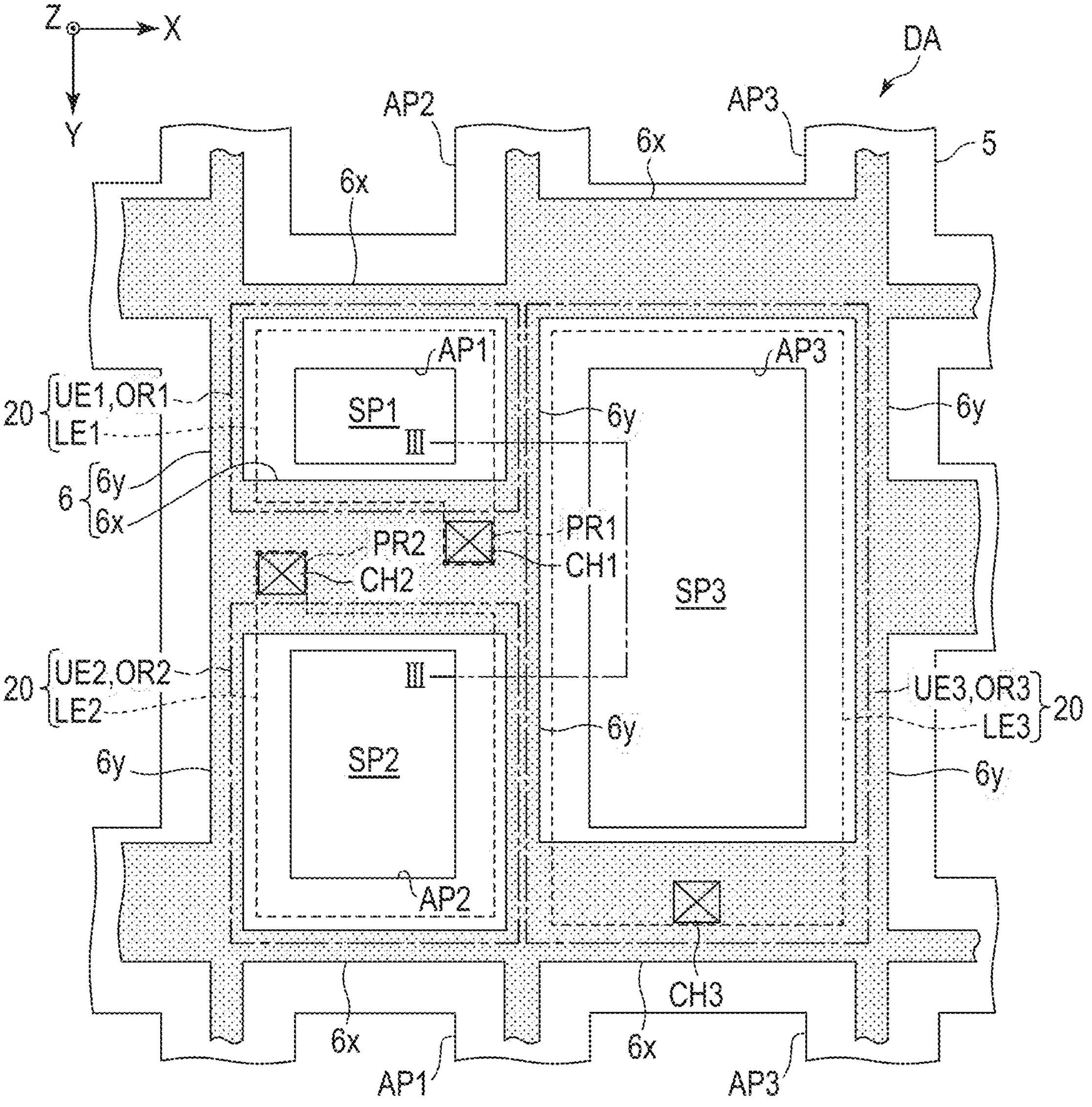
FIG. 2 is a view showing an example of a layout of sub-pixels.

FIG. 2 shows an example of a layout of the sub-pixels SP1, SP2, and SP3. In the example shown in FIG. 2, the sub-pixels SP1 and SP2 are aligned in the direction Y. Furthermore, each of the sub-pixels SP1 and SP2 is arranged with the sub-pixels SP3 in the first direction X.

When the sub-pixels SP1, SP2, and SP3 are arranged in the layout shown in FIG. 2, a row in which the sub-pixels SP1 and SP2 are alternately arranged in the direction Y and a row in which a plurality of sub-pixels SP3 are repeatedly arranged in the direction Y are formed in the display area DA. These rows are alternately arranged in the direction X.

The layout of the sub-pixels SP1, SP2, and SP3 is not limited to the example shown in FIG. 2. As another example, the sub-pixels SP1, SP2, and SP3 in each pixel PX may be arranged in order in the direction X.

A rib 5 and a partition 6 are arranged in the display area DA. The rib 5 includes apertures AP1, AP2, and AP3 in the sub-pixels SP1, SP2, and SP3, respectively. In the example shown in FIG. 2, the aperture AP2 is larger than the aperture AP1, and the aperture AP3 is larger than the aperture AP2. The partition 6 is provided on a boundary between adjacent sub-pixels SP and overlaps with the rib 5 in plan view.

The partition 6 includes a plurality of first partitions 6*x* extending in the direction X and a plurality of second partitions 6*y* extending in the direction Y. The plurality of first partitions 6*x* are arranged between the apertures AP1 and AP2 adjacent in the direction Y and between two apertures AP3 adjacent in the direction Y. The second partitions 6*y* are arranged between the apertures AP1 and AP3 adjacent in the direction X and between the apertures AP2 and AP3 adjacent in the direction X.

In the example shown in FIG. 2, the first partitions 6*x* and the second partitions 6*y* are connected to each other. Thus, the partition 6 has a grating pattern surrounding the apertures AP1, AP2, and AP3 as a whole. The partition 6 is considered to include apertures at the sub-pixels SP1, SP2, and SP3, similarly to the rib 5.

In other words, in the embodiment, the rib 5 and the partition 6 are arranged to divide the sub-pixels SP1, SP2, and SP3.

The sub-pixel SP1 includes a lower electrode LE1, an upper electrode UE1, and an organic layer OR1 each overlapping with the aperture AP1. The sub-pixel SP2 includes a lower electrode LE2, an upper electrode UE2, and an organic layer OR2 each overlapping with the aperture AP2. The sub-pixel SP3 includes a lower electrode LE3, an upper electrode UE3, and an organic layer OR3 each overlapping with the aperture AP3. In the example shown in FIG. 2, outer shapes of the upper electrode UE1 and the organic layer OR1 correspond to each other, outer shapes of the upper electrode UE2 and the organic layer OR2 correspond to each other, and outer shapes of the upper electrode UE3 and the organic layer OR3 correspond to each other.

The lower electrode LE1, the upper electrode UE1, and the organic layer OR1 constitute the display element 20 of the sub-pixel SP1. The lower electrode LE2, the upper electrode UE2, and the organic layer OR2 constitute the display element 20 of the sub-pixel SP2. The lower electrode LE3, the upper electrode UE3, and the organic layer OR3 constitute the display element 20 of the sub-pixel SP3.

The lower electrode LE1 is connected to the pixel circuit 1 which drives (the display element 20 of) the sub-pixel SP1 through a contact hole CH1. The lower electrode LE2 is connected to the pixel circuit 1 which drives (the display element 20 of) the sub-pixel SP2 through a contact hole CH2. The lower electrode LE3 is connected to the pixel circuit 1 which drives (the display element 20 of) the sub-pixel SP3 through a contact hole CH3.

In the example shown in FIG. 2, the contact holes CH1 and CH2 entirely overlap with the first partition 6*x* between the apertures AP1 and AP2 adjacent to each other in the direction Y. The contact hole CH3 entirely overlaps with the first partition 6*x* between two apertures AP3 adjacent in the direction Y. As an alternative example, at least parts of the contact holes CH1, CH2, and CH3 may not overlap with the first partition 6*x*.

In the example shown in FIG. 2, the lower electrodes LE1 and LE2 include protrusions PR1 and PR2, respectively. The protrusion PR1 protrudes from the body of the lower electrode LE1 (i.e., the portion overlapping with the aperture AP1) toward the contact hole CH1. The protrusion PR2 protrudes from the body of the lower electrode LE2 (i.e., the portion overlapping with the aperture AP2) toward the contact hole CH2. The contact holes CH1 and CH2 overlap with the protrusions PR1 and PR2, respectively.

Figure 3:
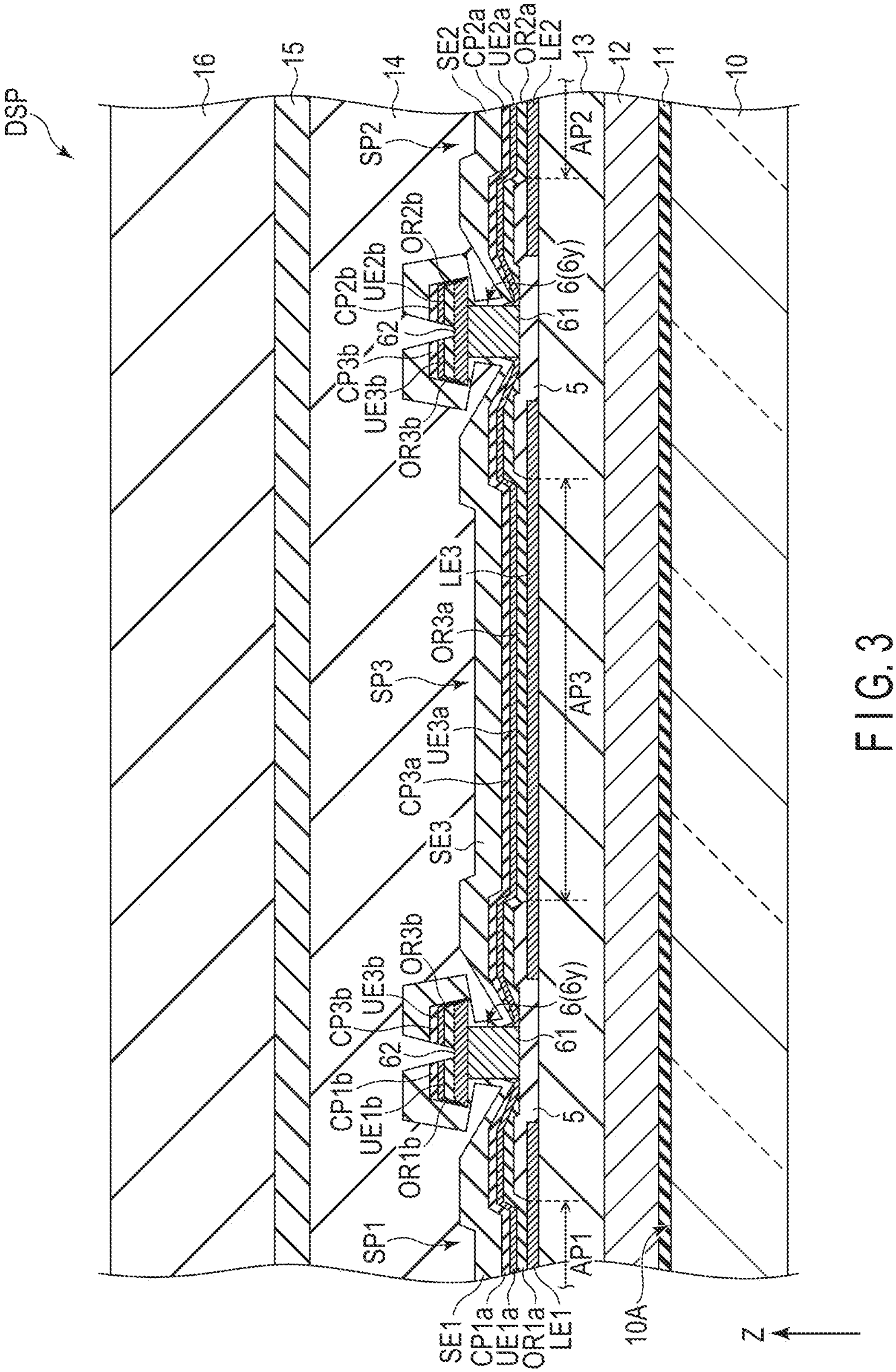
FIG. 3 is a schematic cross-sectional view showing the display device along line III-III in FIG. 2.

FIG. 3 is a schematic cross-sectional view showing the display device DSP along line III-III in FIG. 2. In the display device DSP, an insulating layer 11 referred to as an undercoat layer is arranged on a first surface 10A of the base 10 (i.e., on the surface of the side where the display element 20 and the like are arranged).

The insulating layer 11 has, for example, a three-layer stacked structure with a silicon oxide film (SiO), a silicon nitride film (SiN), and a silicon oxide film (SiO). The insulating layer 11 is not limited to the three-layer stacked structure, but may have a stacked structure with more than three layers, or may have a single-layer structure or a two-layer stacked structure.

A circuit layer 12 is arranged on the insulating layer 11. The circuit layer 12 includes various circuits and wires that drive the sub-pixels SP (SP1, SP2 and SP3) of the pixel circuit 1, the scanning line GL, the signal line SL, the power line PL, and the like shown in FIG. 1. The circuit layer 12 is covered with an insulating layer 13.

The insulating layer 13 functions as a planarization film which planarizes uneven parts generated by the circuit layer 12. Although not shown in FIG. 3, the above-described contact holes CH1, CH2, and CH3 are provided in the insulating layer 13.

The lower electrodes LE (LE1, LE2, and LE3) are arranged on the insulating layer 13. The rib 5 is arranged on the insulating layer 13 and the lower electrodes LE. Ends (parts) of the lower electrodes LE are covered with the rib 5.

The partition 6 includes a lower portion 61 arranged on the rib 5 and an upper portion 62 that covers an upper surface of the lower portion 61. The upper portion 62 has a width greater in direction X and direction Y than the lower portion 61. As a result, the partition 6 has a shape in which both end portions of the upper portion 62 protrude beyond side surfaces of the lower portion 61. This shape of the partition 6 may also be referred to as an overhanging shape.

The organic layers OR (OR1, OR2, and OR3) and the upper electrodes UE (UE1, UE2, and UE3) constitute the display element 20 together with the above-described lower electrodes LE (LE1, LE2, and LE3) but, as shown in FIG. 3, the organic layer OR1 includes a first organic layer OR1*a* and a second organic layer OR1*b* that are separated from each other. The upper electrode UE1 includes a first upper electrode UE1*a* and a second upper electrode UE1*b* that are separated from each other. The first organic layer OR1*a* is in contact with the lower electrode LE1 through the aperture AP1 and covers a part of the rib 5. The second organic layer OR1*b* is located on the upper portion 62. The first upper electrode UE1*a* is opposed to the lower electrode LE1 and covers the first organic layer OR1*a*. Furthermore, the first upper electrode UE1*a* is in contact with the side surfaces of the lower portion 61. The second upper electrode UE1*b* is located on the partition 6 and covers the second organic layer OR1*b*.

In addition, as shown in FIG. 3, the organic layer OR2 includes a first organic layer OR2*a* and a second organic layer OR2*b* that are separated from each other. The upper electrode UE2 includes a first upper electrode UE2*a* and a second upper electrode UE2*b* that are separated from each other. The first organic layer OR2*a* is in contact with the lower electrode LE2 through the aperture AP2 and covers a part of the rib 5. The second organic layer OR2*b* is located on the upper portion 62. The first upper electrode UE2*a* is opposed to the lower electrode LE2 and covers the first organic layer OR2*a*. Furthermore, the first upper electrode UE2*a* is in contact with the side surfaces of the lower portion 61. The second upper electrode UE2*b* is located above the partition 6 and covers the second organic layer OR2*b*.

In addition, as shown in FIG. 3, the organic layer OR3 includes a first organic layer OR3*a* and a second organic layer OR3*b* that are separated from each other. The upper electrode UE3 includes a first upper electrode UE3*a* and a second upper electrode UE3*b* that are separated from each other. The first organic layer OR3*a* is in contact with the lower electrode LE3 through the aperture AP3 and covers a part of the rib 5. The second organic layer OR3*b* is located on the upper portion 62. The first upper electrode UE3*a* is opposed to the lower electrode LE3 and covers the first organic layer OR3*a*. Furthermore, the first upper electrode UE3*a* is in contact with the side surfaces of the lower portion 61. The second upper electrode UE3*b* is located above the partition 6 and covers the second organic layer OR3*b*.

In the example shown in FIG. 3, the sub-pixels SP1, SP2 and SP3 include cap layers CP1, CP2 and CP3 for adjusting the optical property of the light emitted from light emitting layers of the respective organic layers OR1, OR2 and OR3.

The cap layer CP1 includes a first cap layer CP1*a* and a second cap layer CP1*b* that are separated from each other. The first cap layer CP1*a* is located in the aperture AP1 and is arranged on the first upper electrode UE1*a*. The second cap layer CP1*b* is located above the partition 6 and is arranged on the second upper electrode UE1*b*.

The cap layer CP2 includes a first cap layer CP2*a* and a second cap layer CP2*b* that are separated from each other. The first cap layer CP2*a* is located in the aperture AP2 and is arranged on the first upper electrode UE2*a*. The second cap layer CP2*b* is located above the partition 6 and is arranged on the second upper electrode UE2*b*.

The cap layer CP3 includes a first cap layer CP3*a* and a second cap layer CP3*b* that are separated from each other. The first cap layer CP3*a* is located in the aperture AP3 and is arranged on the first upper electrode UE3*a*. The second cap layer CP3*b* is located above the partition 6 and is arranged on the second upper electrode UE3*b*.

Sealing layers SE1, SE2 and SE3 are provided in the sub-pixels SP1, SP2 and SP3, respectively. The sealing layer SE1 continuously covers the members of the sub-pixel SP1 including the first cap layer CP1*a*, the partition 6, and the second cap layer CP1*b*. The sealing layer SE2 continuously covers the members of the sub-pixel SP2 including the first cap layer CP2*a*, the partition 6, and the second cap layer CP2*b*. The sealing layer SE3 continuously covers the members of the sub-pixel SP3 including the first cap layer CP3*a*, the partition 6, and the second cap layer CP3*b*.

In the example shown in FIG. 3, the second organic layer OR1*b*, the second upper electrode UE1*b*, the second cap layer CP1*b*, and the sealing layer SE1 on the partition 6 between the sub-pixels SP1 and SP3 are separated from the second organic layer OR3*b*, the second upper electrode UE3*b*, the second cap layer CP3*b*, and the sealing layer SE3 on the partition 6. In addition, the second organic layer OR2*b*, the second upper electrode UE2*b*, the second cap layer CP2*b*, and the sealing layer SE2 on the partition 6 between the sub-pixels SP2 and SP3 are separated from the second organic layer OR3*b*, the second upper electrode UE3*b*, the second cap layer CP3*b*, and the sealing layer SE3 on the partition 6.

The sealing layers SE1, SE2, and SE3 are covered with a resin layer 14. The resinous layer 14 is covered with a sealing layer 15. Furthermore, the sealing layer 15 is covered with a resin layer 16.

The insulating layer 13 and the resin layers 14 and 16 are formed of organic materials. The rib 5, the sealing layers 15 and SE (SE1, SE2 and SE3) are formed of, for example, an inorganic material such as silicon nitride (SiNx).

The lower portion 61 included in the partition 6 is conductive. The upper portion 62 included in the partition 6 may also be conductive. The lower electrode LE may be formed of a transparent conductive oxide such as indium tin oxide (ITO) or may have a stacked structure of a metal material such as silver (Ag) and a conductive oxide. The upper electrode UE is formed of, for example, a metal material such as an alloy (MgAg) of magnesium and silver. The upper electrode UE may be formed of a conductive oxide such as ITO.

When the potential of the lower electrode LE is relatively higher than the potential of the upper electrode UE, the lower electrode corresponds to an anode, and the upper electrode UE corresponds to a cathode. In addition, when the potential of the upper electrode UE is relatively higher than the potential of the lower electrode LE, the upper electrode UE corresponds to an anode, and the lower electrode LE corresponds to a cathode.

The organic layer OR includes a pair of functional layers, and a light emitting layer arranged between these functional layers. As an example, the organic layer OR has a structure in which a hole-injection layer, a hole-transport layer, an electron blocking layer, a light emitting layer, a hole blocking layer, an electron-transport layer, and an electron-injection layer are stacked in this order.

The cap layer CP (CP1, CP2, and CP3) is formed of, for example, a multilayer body of a plurality of transparent thin films. As the plurality of thin films, the multilayer body may include a thin film formed of an inorganic material and a thin film formed of an organic material. In addition, these thin films have refractive indices different from each other. The materials of the thin films constituting the multilayer body are different from the materials of the upper electrode UE and are also different from the materials of the sealing layer SE. Incidentally, the cap layer CP may be omitted.

A common voltage is supplied to the partition 6. This common voltage is supplied to each of the upper electrodes UE (first upper electrodes UE1*a*, UE2*a*, and UE3*a*) that are in contact with the side surfaces of the lower portion 61. A pixel voltage is supplied to the lower electrodes LE (LE1, LE2, and LE3) through the pixel circuits 1 included in the respective sub-pixels SP (SP1, SP2, and SP3).

When a potential difference is formed between the lower electrode LE1 and the upper electrode UE1, the light emitting layer of the first organic layer OR1*a* emits light of the red wavelength range. When a potential difference is formed between the lower electrode LE2 and the upper electrode UE2, the light emitting layer of the first organic layer OR2*a* emits light of the green wavelength range. When a potential difference is formed between the lower electrode LE3 and the upper electrode UE3, the light emitting layer of the first organic layer OR3*a* emits light of the blue wavelength range.

As another example, the light emitting layers of the organic layers OR1, OR2, and OR3 may emit light of the same color (for example, white). In this case, the display device DSP may include a color filter that converts the light emitted from the light emitting layers into light of the color corresponding to the sub-pixels SP1, SP2, and SP3. In addition, the display device DSP may include a layer including quantum dots that are excited by the light emitted from the light emitting layers to generate the light of the colors corresponding to the sub-pixels SP1, SP2, and SP3.

Figure 4:
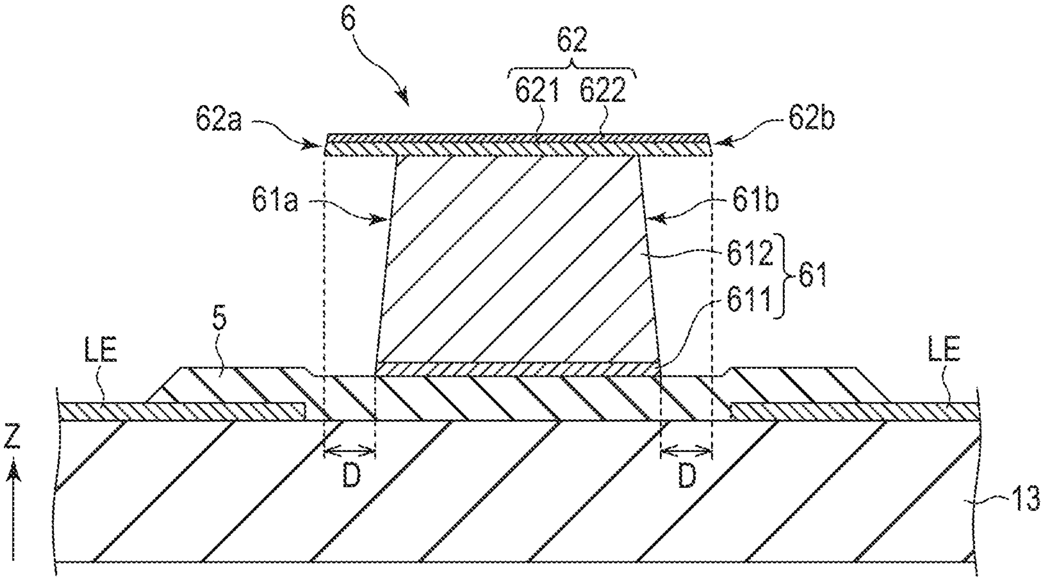
FIG. 4 is a schematic cross-sectional view showing a partition.

FIG. 4 is a schematic enlarged cross-sectional view showing the partition 6. In FIG. 4, the elements other than the rib 5, the partition 6, the insulating layer 12 and a pair of lower electrodes LE are omitted. The pair of lower electrodes LE correspond to any of the above-described lower electrodes LE1, LE2 or LE3. In addition, the first partition 6*x* and the second partition 6*y* described above have the same structure as the partition 6 shown in FIG. 4.

In the example shown in FIG. 4, the lower portion 61 included in the partition 6 includes a barrier layer 611 arranged on the rib 5, and a metal layer 612 arranged on the barrier layer 611. The barrier layer 611 is formed of a material different from the metal layer 612, for example, a metal material such as molybdenum. The metal layer 612 is formed to be thicker than the barrier layer 611. The metal layer 612 may have a single-layer structure or a multilayer structure of different metal materials. As an example, the metal layer 612 is formed of, for example, aluminum (Al).

The upper portion 62 is thinner than the lower portion 61. In the example shown in FIG. 4, the upper portion 62 includes a first layer 621 arranged on the metal layer 612, and a second layer 622 arranged on the first layer 621. As an example, the first layer 621 is formed of, for example, titanium (Ti) and the second layer 622 is formed of, for example, ITO. It has been described that the upper portion 62 has a two-layer stacked structure, but the upper portion 62 may have a single-layer structure formed of, for example, a metal material such as titanium. Alternatively, the upper portion 62 may also be formed of a material other than a metal material, and may be formed of an inorganic material such as silicon oxide (SiO). Furthermore, the upper portion 62 may be formed by stacking an appropriate combination of the conductive oxide such as ITO, the metal material such as titanium, and the inorganic material such as silicon oxide, which have been described above, or may be formed of a single layer of any of the above-described materials.

In the example shown in FIG. 4, the width of the lower portion 61 becomes smaller toward the upper portion 62. In other words, the side surfaces 61*a* and 61*b* of the lower portion 61 are inclined to the direction Z. The upper portion 62 includes an end portion 62*a* protruding from the side surface 61*a* and an end portion 62*b* protruding from the side surface 61*b*.

An amount D by which the end portions 62*a* and 62*b* protrude from the side surfaces 61*a* and 61*b* (hereinafter referred to as an amount of protrusion D of the partition 6) is, for example, 2.0 μm or less. The amount of protrusion D of the partition 6 in the embodiment corresponds to a length (distance) in the width direction (direction X or direction Y) orthogonal to the direction Z of the partition 6, between a lower end (barrier layer 611) of the side surfaces 61*a* and 61*b*, and the end portions 62*a* and 62*b*. The amount of protrusion D of the partition 6 may be a length in the width direction orthogonal to the direction Z of the partition 6, between upper ends of the side surfaces 61*a* and 61*b*, and the end portions 62*a* and 62*b*.

It is assumed that the structure of the partition 6 and the materials of each part of the partition 6 can be selected as appropriate by considering, for example, a method of forming the partition 6, and the like.

In the embodiment, the partition 6 is formed to divide the sub-pixels SP in plan view. The above-described organic layer OR is formed by, for example, anisotropic or directional vacuum evaporation but, when the organic material for forming the organic layer OR is evaporated over the entire base 10 in a state in which the partition 6 is arranged, the organic layer OR is hardly formed on the side surfaces of the partition 6 since the partition 6 has the shape shown in FIG. 3 and FIG. 4. According to this, the organic layer OR (display element 20) which is divided for each sub-pixel SP by the partition 6 can be formed.

Figure 5:
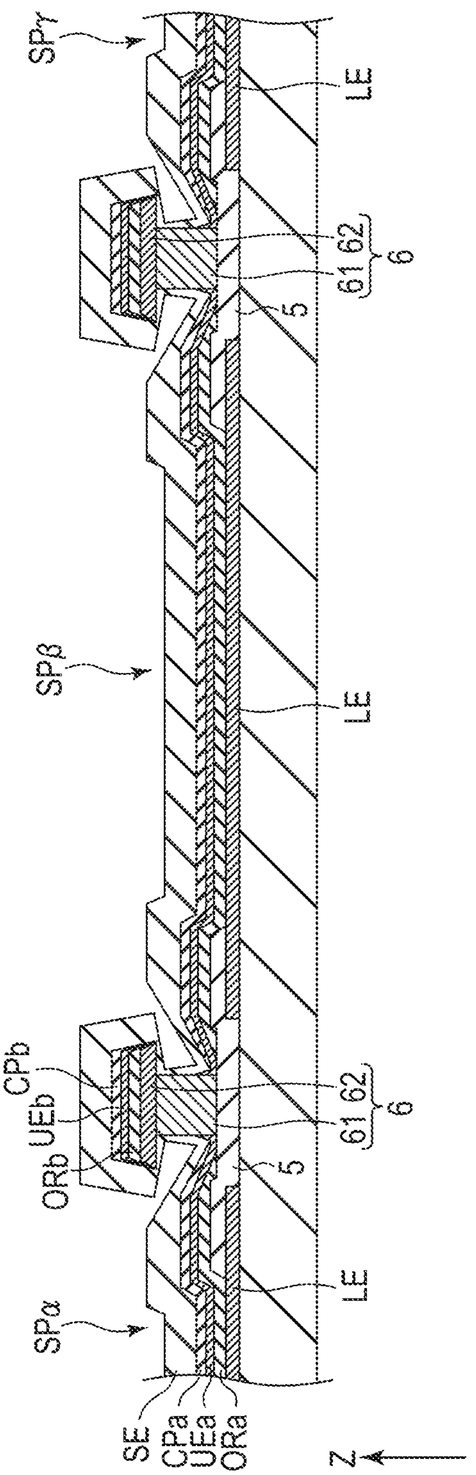
FIG. 5 is a schematic cross-sectional view illustrating a display element formed using the partition.
Figure 6:
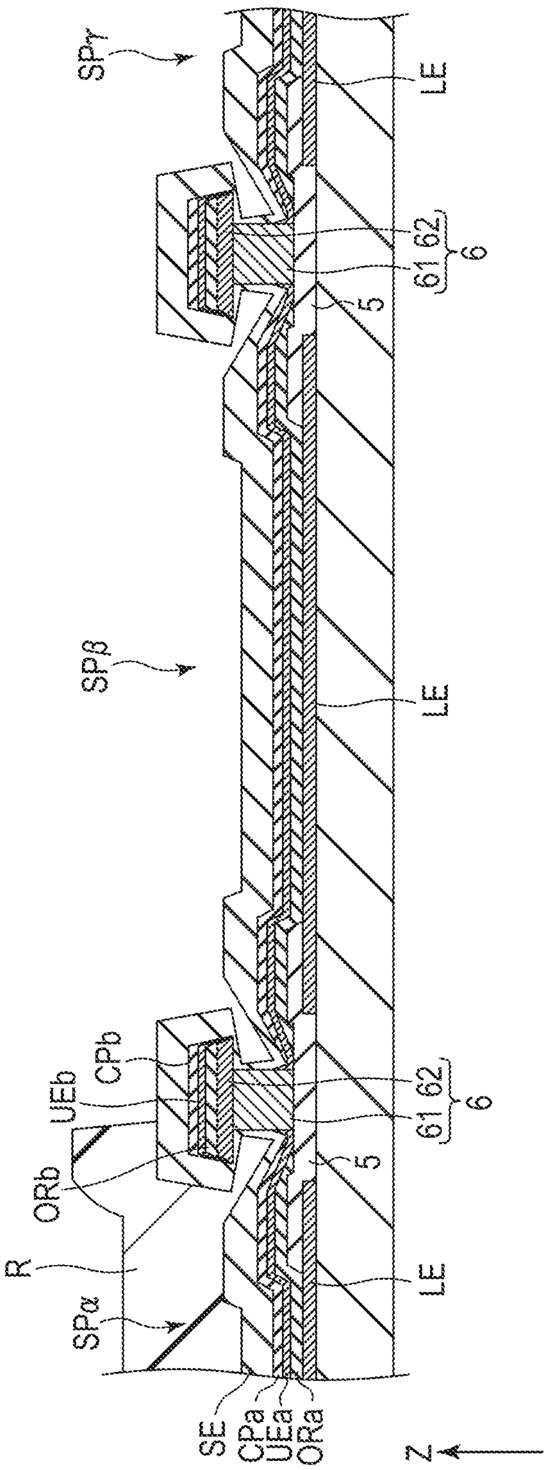
FIG. 6 is a schematic cross-sectional view illustrating the display element formed using the partition.
Figure 7:
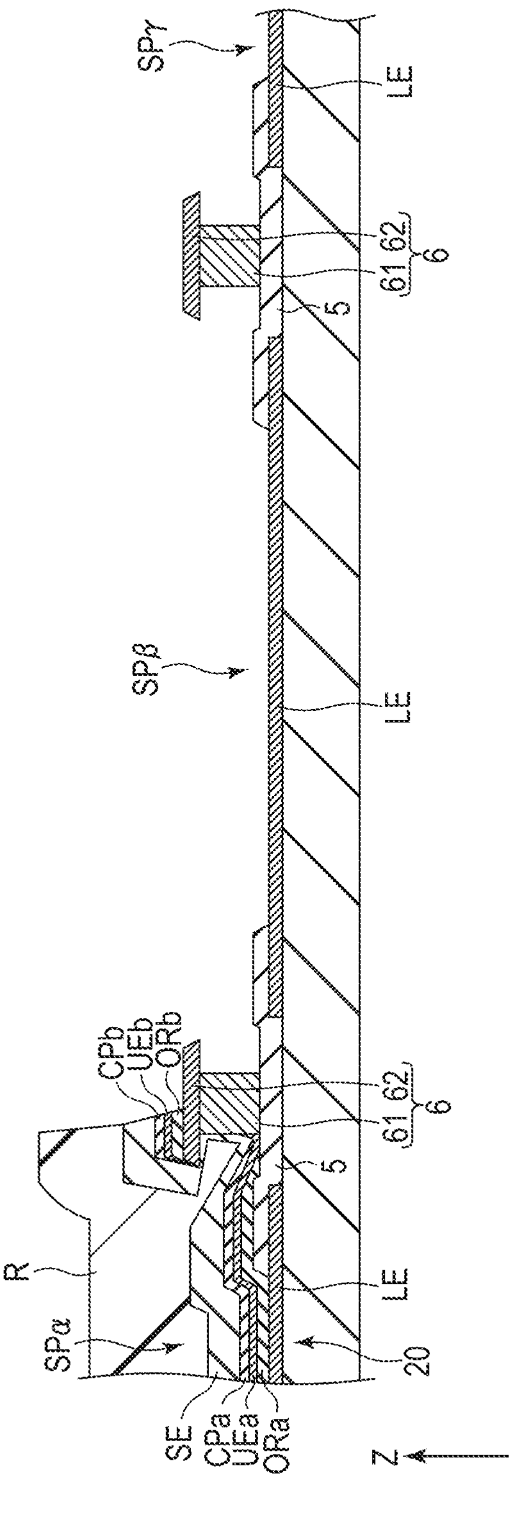
FIG. 7 is a schematic cross-sectional view illustrating the display element formed using the partition.

FIG. 5 to FIG. 7 are schematic cross-sectional views illustrating the display element 20 formed using the partition 6. Each of sub-pixels SPα, SPβ and SPγ shown in FIG. 5 to FIG. 7 corresponds to any one of the sub-pixels SP1, SP2 and SP3.

In a state in which the partition 6 is arranged as described above, the organic layer OR, the upper electrode UE, the cap layer CP, and the sealing layer SE are formed in order on the entire base 10 by vapor deposition as shown in FIG. 5. The organic layer OR includes a light emitting layer which emits light of a color corresponding to the sub-pixel SPα. The partition 6 in an overhanging shape divides the organic layer OR into a first organic layer ORa which covers the lower electrode LE and a second organic layer ORb on the partition 6, divides the upper electrode UE into a first upper electrode UEa which covers the first organic layer ORa and a second upper electrode UEb which covers the second organic layer ORb, and divides the cap layer CP into a first cap layer CPa which covers the first upper electrode UEa and a second cap layer CPb which covers the second upper electrode UEb. The first upper electrode UEa is in contact with the lower portion 61 of the partition 6. The sealing layer SE continuously covers the first cap layer CPa, the second cap layer CPb, and the partition 6.

Next, a resist R is formed on the sealing layer SE as shown in FIG. 6. The resist R covers the sub-pixel SPα. In other words, the resist R is arranged directly above the first organic layer ORa, the first upper electrode UEa, and the first cap layer CPa, which are located in the sub-pixel SPα. The resist R is also located directly above portions close to the sub-pixel SPα, of the second organic layer ORb, the second upper electrode UEb, and the second cap layer CPb on the partition 6 between the sub-pixel SPα and the sub-pixel SPβ. In other words, at least a part of the partition 6 is exposed from the resist R.

Furthermore, portions exposed from the resist R, of the organic layer OR, the upper electrode UE, the cap layer CP and the sealing layer SE, are removed as shown in FIG. 7, by etching using the resist R as a mask. The display element 20 including the lower electrode LE, the first organic layer ORa, the first upper electrode UEa, and the first cap layer CPa is thereby formed in the sub-pixel SPα. In contrast, the lower electrode LE is exposed in the sub-pixels SET, and SPγ. The above-described etching includes, for example, dry etching of the sealing layer SE, wet etching and dry etching of the cap layer CP, wet etching of the upper electrode UE, and dry etching of the organic layer OR.

When the display element 20 of the sub-pixel SPα is formed as described above, the resist R is removed, and the display elements 20 of the sub-pixels SET, and SPγ are formed in order, similarly to the sub-pixel SPα.

The display elements 20 of the sub-pixels SP1, SP2, and SP3 are formed, and the resin layer 14, the sealing layer 15, and the resin layer 16 are formed, as exemplified for the above sub-pixels SPα, SPβ, and SPγ, and the structure of the display device DSP shown in FIG. 3 is thereby implemented.

The partition 6 includes the lower portion 61 and the upper portion 62 protruding from the side surface of the lower portion 61 as described above but, if the amount of protrusion D of the partition 6 is not sufficiently large, the organic layer OR may not be able to be divided appropriately. In addition, if the side surfaces of the lower portion 61 included in the partition 6 are covered with the organic layer OR, the electric connection between the lower portion 61 and the upper electrode UE is inhibited. In contrast, the upper electrode UE is in contact with the side surfaces of the lower portion 61 included in the partition 6, in the display device DSP, but, if the amount of protrusion D of the partition 6 exceeds a designed value, the upper electrode UE may not be in contact with the side surfaces of the lower portion 61.

In other words, since a highly reliable display device DSP cannot be manufactured in a case where the above-described amount of protrusion D of the partition 6 is not appropriate, it is useful to measure the amount of protrusion D (i.e., the length between the side surface of the lower portion 61 included in the partition 6 and the end portion of the upper portion 62) in the process of manufacturing the display device DSP.

Using, for example, an optical microscope capable of observing an expanded image of an object for the measurement of the above-described amount of protrusion D of the partition 6 will be considered here.

Figure 8:
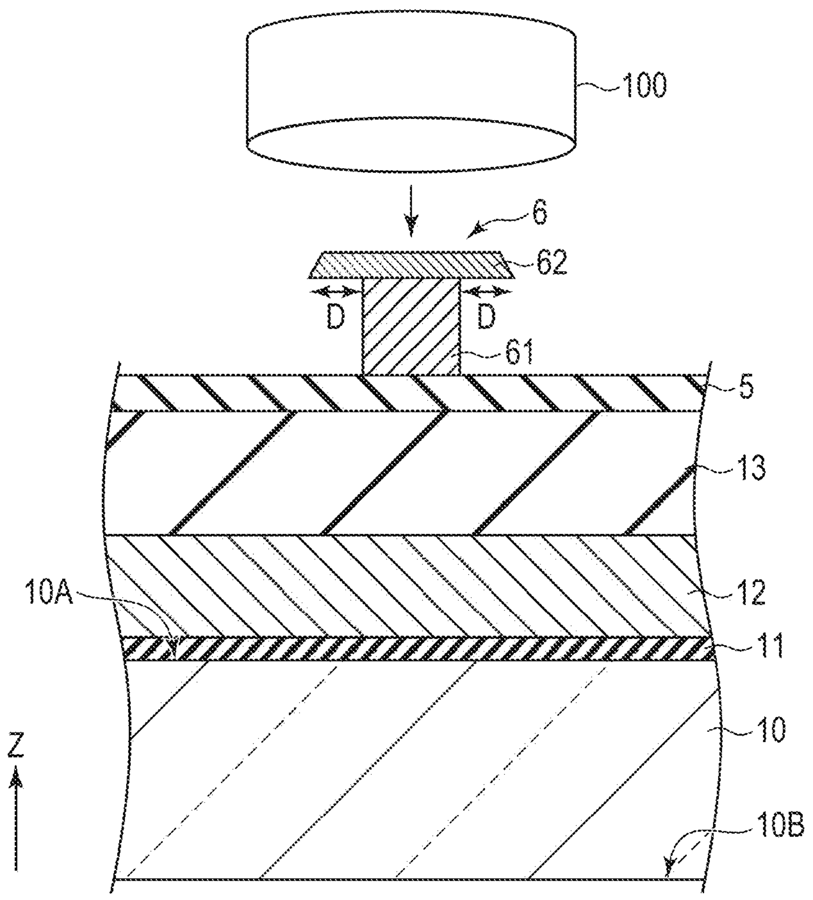
FIG. 8 is a view illustrating measurement of an amount of protrusion of the partition.

In this case, if the amount of protrusion D of the partition 6 is assumed to be measured by observing the partition 6 from the direction Z (i.e., the first surface A side of the base 10) by using the optical microscope 100 when the partition 6 is formed as shown in, for example, FIG. 8, the side surfaces of the lower portion 61 (i.e., the end portions of the lower portion 61 in the direction X or the direction Y) cannot be observed with the optical microscope 100 since the upper portion 62 included in the partition 6 has a width larger than the lower portion 61 (i.e., the shape of the partition 6 is overhanging). In other words, when the partition 6 is observed from the direction Z with the optical microscope 100 as shown in FIG. 8, the length (width) of the upper portion 62 in the direction X and the direction Y can be measured, but the amount of protrusion D of the partition 6 cannot be measured.

Figure 9:
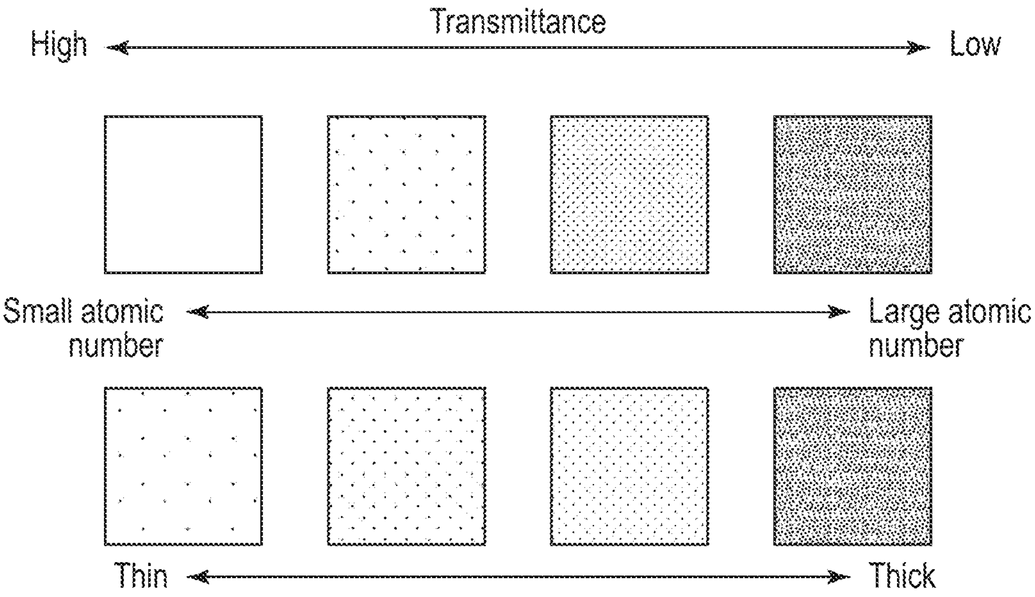
FIG. 9 is a view illustrating an X-ray transmittance.

Incidentally, it is known that X rays, which is a type of electromagnetic waves, pass through an object and that its transmittance is varied depending on the material and thickness of the object. FIG. 9 schematically shows the X-ray transmittance, which is varied depending on the material and thickness of the object. As shown in FIG. 9, the X-ray transmittance is higher for a material of a smaller atomic number and is lower for a material of a larger atomic number. In other words, a material of a smaller atomic number allows X rays to pass more easily, and a material of a larger atomic number blocks X rays more easily. In addition, the X-ray transmittance is higher as an object is thinner and is lower as an object is thicker.

Figure 10:
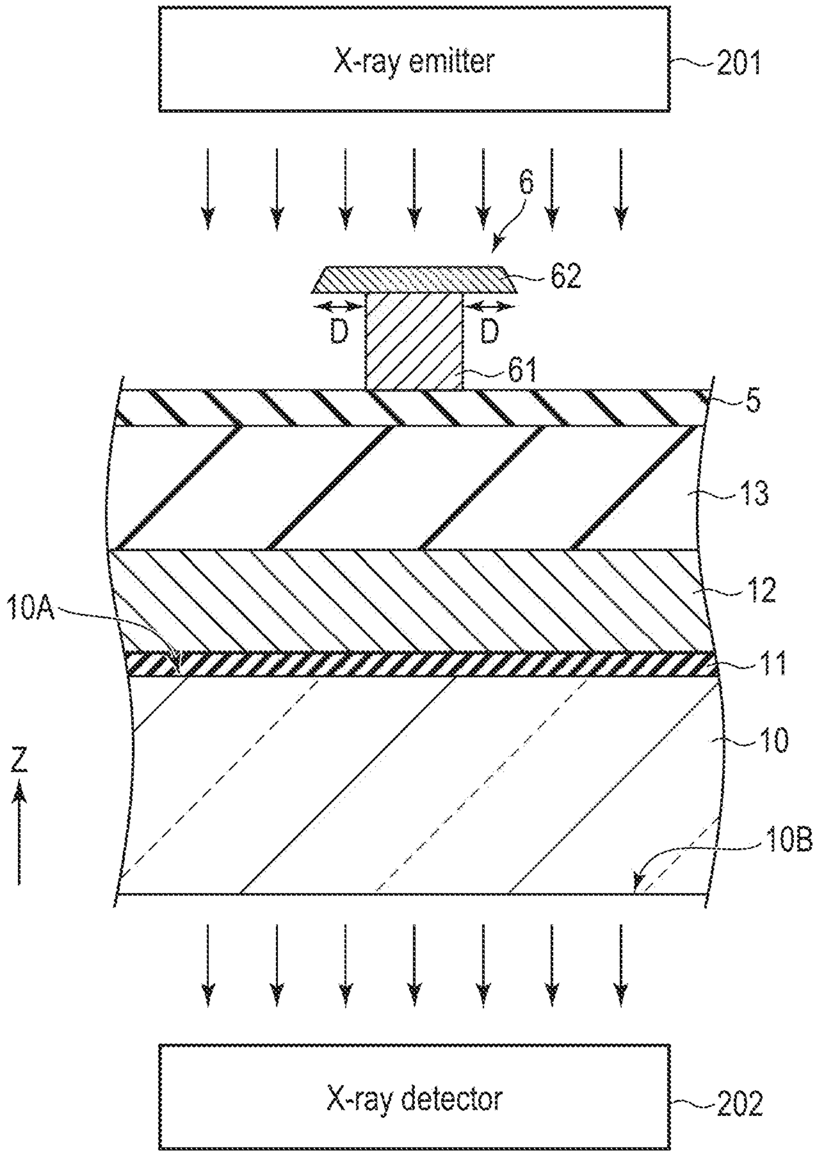
FIG. 10 is a view illustrating measurement of an amount of protrusion of the partition.

In the embodiment, the amount of protrusion D of the partition 6 is assumed to be measured with the X rays. More specifically, the amount of protrusion D of the partition 6 is measured based on an X-ray image (transmitted light image) generated by emitting X rays from an X-ray emitter 201 arranged on the first surface A side of the base 10 as shown in FIG. 10 and detecting (the intensity of) X rays passing through the partition 6, and the base 10, and the insulating layer 11, the circuit layer 12, the insulating layer 13, and the rib formed on the base 1 (hereinafter referred to as base and the like for convenience) with an X-ray detector 202 arranged on a second surface B side of the base 10.

For example, at least parts of the partition 6 and the circuit layer 12 are formed of a metal material and, in the embodiment, X rays having the intensity enough to pass through the metal material are assumed to be emitted from the X-ray emitter 201.

In addition, in the embodiment, the amount of protrusion D of the partition 6 is assumed to be measured by a measuring device which includes the X-ray emitter 201 and the X-ray detector 202 described above and which is communicably connected to an image generation device configured to generate an X-ray image. Incidentally, the measuring device may be implemented integrally with the image generation device.

Figure 11:
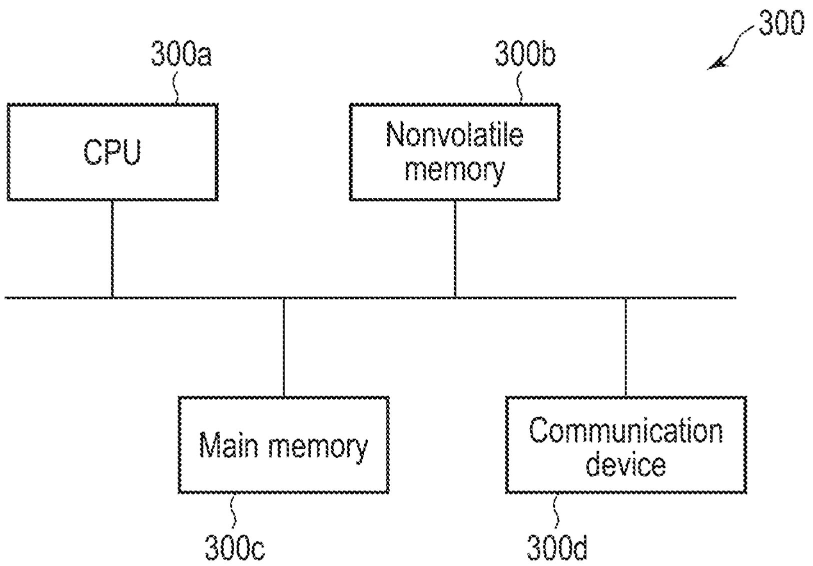
FIG. 11 is a view showing an example of a hardware configuration of a measuring device.

The measuring device according to the embodiment will be described below. FIG. 11 shows an example of a hardware configuration of the measuring device.

A measuring device 300 shown in FIG. 11 is implemented by, for example, a personal computer or the like and includes a CPU 300*a*, a nonvolatile memory 300*b*, a main memory 300*c*, a communication device 300*d*, and the like.

The CPU 300*a* is a processor for controlling the operation of the measuring device 300 and executes various programs loaded from the nonvolatile memory 300*b* into the main memory 300*c*. The communication device 300*d* executes communication with external devices (for example, the image generation device and the like) of the measuring device 300.

Figure 12:
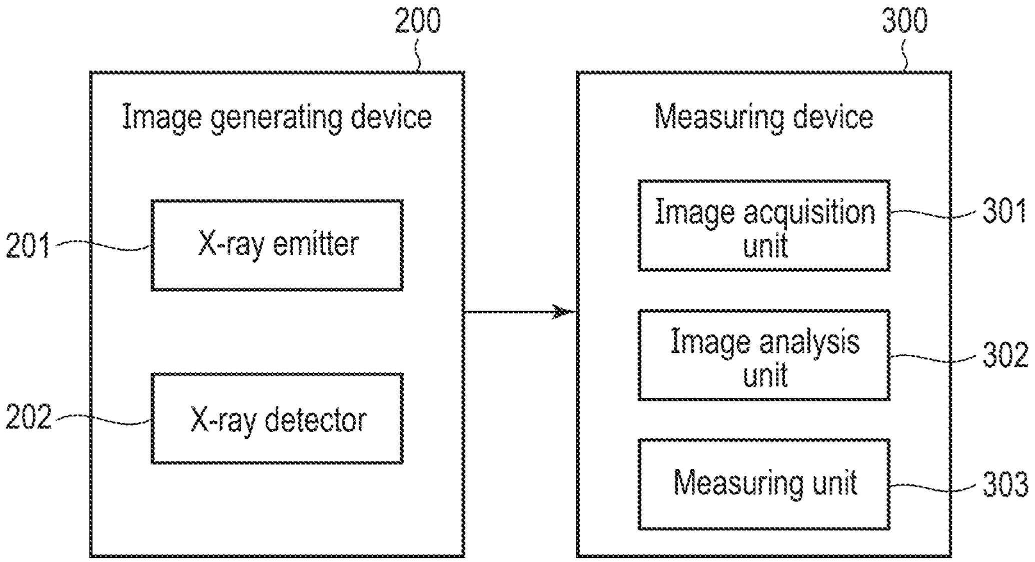
FIG. 12 is a view showing an example of a functional configuration of the measuring device.

FIG. 12 shows an example of a functional configuration of the measuring device 300. As shown in FIG. 12, the measuring device 300 is communicably connected to an image generation device 200 including the X-ray emitter 201 and the X-ray detector 202 described above, and includes an image acquisition unit 301, an image analysis unit 302, and a measuring unit 303.

Some or all of the units 301 to 303 included in the measuring device 300 are functional units implemented by, for example, the above-described CPU 300*a* (i.e., the computer of the measuring device 300) executing predetermined programs (i.e., software), but may be implemented by, for example, hardware such as an integrated circuit (IC) and the like or by a combination of software and hardware.

The image acquisition unit 301 acquires from the image generation device 200 X-ray images including the partition 6, which are generated by the image generation device 200. The image analysis unit 302 analyzes the X-ray images acquired by the image acquisition unit 301. The measuring unit 303 measures the amount of protrusion D of the partition 6 formed on the above-described base 10 (i.e., the amount of protrusion at which the end portion of the upper portion 62 protrudes from the side surface of the lower portion 61 included in the partition 6), based on the analysis results of the image analyzing unit 302.

Incidentally, the measuring device 300 may be implemented integrally with the image generation device 200 as described above but, in this case, the measuring device 300 may be configured to include an X-ray emitting unit corresponding to the X-ray emitter 201 and an X-ray detecting unit corresponding to the X-ray detector 202.

An example of the processing procedure of the measuring device 300 according to the embodiment will be described below with reference to a flowchart of FIG. 13.

First, when the insulating layer 11, the circuit layer 12, the insulating layer 13, the lower electrode LE, the rib 5, and the partition 6 are formed on the base 10, the X-ray emitter 201 provided in the image generation device 200 emits X rays from the first surface 10A side of the base 10 toward the partition 6. The X rays thus emitted from the X-ray emitter 201 pass through the partition 6, the base 10, and the like and are detected by the X-ray detector 202. Incidentally, the intensity of the X rays (transmission X rays) detected by the X-ray detector 202 is varied depending on the material, thickness, and the like of the object through which the X rays pass. The image generation device 200 generates X-ray images (transmission X-ray images), based on the intensity of X rays thus detected by the X-ray detector 202. Incidentally, the X-ray images generated by the image generation device 200 are X-Y plane images including the partition 6. The image generation device 200 outputs the X-ray images generated by the image generation device 200 in the above-described manner to the measuring device 300.

The image acquisition unit 301 included in the measuring device 300 acquires the X-ray images output from the image generation device 200 (step S1).

The X-ray images acquired in step S1 described above are composed of a plurality of pixels, and each of the pixels holds the luminance value based on the intensity of X rays (i.e., the pixel value for displaying the X-ray images). For this reason, the image analysis unit 302 acquires the luminance value held by each of the plurality of pixels constituting the X-ray images in step S2 (hereinafter simply referred to as a pixel luminance value) (step S2).

Next, the image analysis unit 302 identifies a pixel (hereinafter referred to as a first pixel) corresponding to the side surface of the lower portion 61 included in the X-ray images, and a pixel (hereinafter referred to as a second pixel) corresponding to the end portion of the upper portion 62, based on the luminance values of the plurality of pixels acquired in step S2 (step S3). Incidentally, the process of step S3 corresponds to a process of identifying coordinate values of the side surface of the lower portion 61 and coordinates of the end portion of the upper portion 62, in the X-ray images.

When the process of step S3 is executed, the image analysis unit 302 refers to the X-ray images acquired in step S1 to acquire (count) the number of pixels arranged between the first and second pixels identified in step S3 (step S4).

Figure 14:
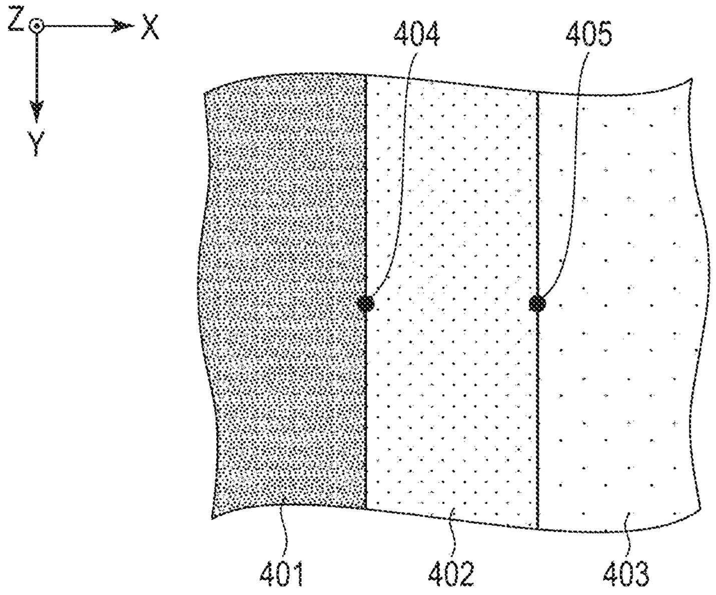
FIG. 14 is an enlarged view showing a part of an X-ray image.

The above-described process of step S4 will be specifically described below with reference to FIG. 14. FIG. 14 is an enlarged view showing a part of an X-ray image.

In the example shown in FIG. 14, the X-ray image includes first to third areas 401 to 403. The first area 401 corresponds to an area overlapping with the base 10 and the like, the lower portion 61, and the upper portion 62, in plan view. The second area 402 corresponds to an area which overlaps with the base 10 and the like and the upper portion 62 but does not overlap with the lower portion 61, in plan view. The third area 403 corresponds to an area which overlaps with the base 10 and the like but does not overlap with the partition 6 (lower portion 61 and upper portion 62), in plan view.

Hatching attached to each of the first to third areas 401 to 403 shown in FIG. 14 indicates a luminance value of the pixels constituting each of the first to third areas 401 to 403, and the luminance value (i.e., the intensity based on the X-ray transmittance) is varied depending on the material and the thickness of the object through which X rays pass.

More specifically, the luminance value of the pixels constituting the first area 401 is the value corresponding to the intensity of X rays which pass through the upper portion 62, the lower portion 61, and the base 10 in this order. In this case, the luminance value of the pixels constituting the first area 401 is lower than the luminance values of the pixels constituting the second area 402 and the third area 403.

In addition, the luminance value of the pixels constituting the second area 402 is the value corresponding to the intensity of X rays which pass through the upper portion 62 and the base 10 in this order. In this case, the luminance value of the pixels constituting the second area 402 is higher than the luminance value of the pixels constituting the first area 401 and lower than the luminance value of the pixels constituting the third area 403.

The luminance value of the pixels constituting the third area 403 is the value corresponding to the intensity of X rays which pass through the base 10. In this case, the luminance value of the pixels constituting the third area 403 is higher than the luminance values of the pixels constituting the first area 401 and the second area 402.

According to such an X-ray image, for example, a pixel 404 corresponding to a boundary between the first area 401 and the second area 402 refers to a first pixel, and a pixel 405 corresponding to a boundary between the second area 402 and the third area 403 refers to a second pixel. In this case, the number of pixels arranged between the pixel 404 (first pixel) and the pixel 405 (second pixel) refers to the amount of protrusion D.

Incidentally, the boundary between the first area 401 and the second area 402 (i.e., the first pixel), and the boundary between the second area 402 and the third area 403 (i.e., the second pixel), can be identified based on, for example, whether or not the amount of variation of the luminance value from the pixels adjacent in the direction X is larger than or equal to a predetermined value. In addition, when the pixel 404 (first pixel) located on the boundary between the first area 401 and the second area 402 is identified, for example, the pixel 405 closest to the pixel 404, of a plurality of pixels located on the boundary between the second area 402 and the third area 403 is identified as the second pixel.

Figure 13:
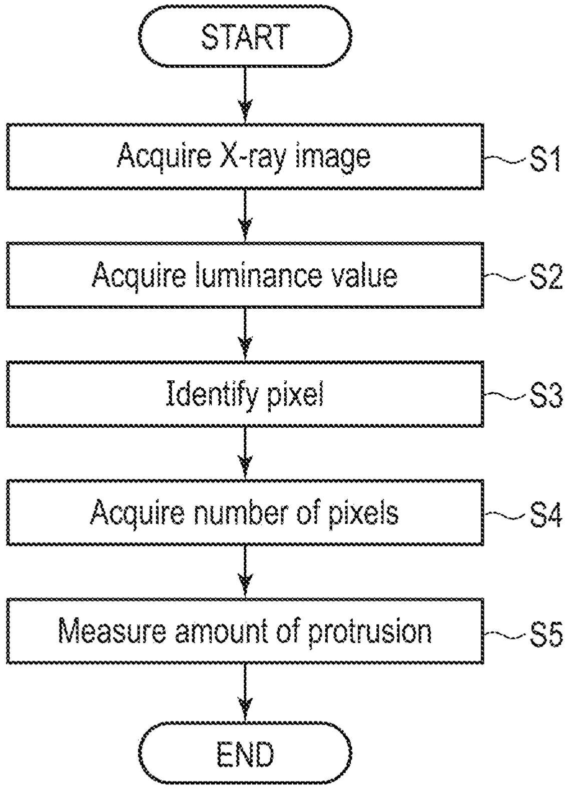
FIG. 13 is a flowchart illustrating an example of a processing procedure of the measuring device.

With reference to FIG. 13, the measuring unit 303 measures the amount of protrusion D of the partition 6, based on the number of pixels acquired in step S4 (step S5).

In step S5, the measurement unit 303 executes a process of converting the number of pixels acquired in step S4 into the amount of protrusion D of the partition 6 (i.e., a length between the side surface of the lower portion 61 and the end portion of the upper portion 62), based on, for example, conversion information prepared in advance.

The conversion information is generated based on, for example, the X-ray image including the sample whose size (length) is already known (i.e., a standard sample image including the sample generated by emitting X rays). More specifically, the conversion information indicating the length corresponding to one pixel is generated by counting the number of pixels arranged between (a pixel corresponding to) one end and (a pixel corresponding to) the other end of the sample included in the standard sample image and dividing the known size of the sample by the number of pixels. According to such conversion information, the number of pixels can be converted into the amount of protrusion D of the partition 6 by multiplying the length corresponding to one pixel indicated by the conversion information by the number of pixels acquired in step S4. The conversion information may be any information that enables the number of pixels to be converted into the length (i.e., information that the correspondence between the number of pixels and the length is defined).

It has been described that the amount of protrusion D of the partition 6 is measured based on the above-described conversion information, but the amount of protrusion D of the partition 6 may be measured (calculated) using a machine learning model generated by a machine learning algorithm such as a neural network. Such a machine learning model may be configured to output (predict) the amount of protrusion D of the partition 6 by inputting the number of pixels arranged between the first pixel and the second pixel, by learning a data set including (a combination of) both the number of pixels arranged between the first pixel and the second pixel, which is identified manually or automatically from the X-ray image including the partition 6 whose amount of protrusion D is already known and the known amount of protrusion D of the partition 6 included in the X-ray image.

When the amount of protrusion D of the partition 6 measured by executing the above-described process shown in FIG. 13 is appropriate, the display element 20 of each sub-pixel SP can be formed as described above with reference to FIG. 5 to FIG. 7.

Measuring the amount of protrusion D of a part of the partition 6 formed on the base 10 has been described with reference to FIG. 13, but the process shown in FIG. 13 may be executed a plurality of times to measure the amount of protrusion D for a plurality of parts of the partition 6.

In addition, in general, a motherboard on which a plurality of display panels are formed on a mother base including a plurality of bases 10 is manufactured and the display device DSP is manufactured using each of the display panels cut from the motherboard, in the process of manufacturing the display device DSP, and the measuring device 300 of the embodiment is used in a case of measuring the amount of protrusion D of the partition 6 by emitting X rays to the motherboard (i.e., the partition 6 formed on the mother base) when the motherboard on which the insulating layer 11, the circuit layer 12, the insulating layer 13, the lower electrode LE, the rib 5, and the partition 6 are formed on the mother base is manufactured.

As described above, in the embodiment, the partition 6 including both the lower portion 61 arranged on the first surface 10A side of the base 10 and the upper portion protruding from the side surfaces of the lower portion 61 is formed, the X-ray image (first image) including the partition 6, which is generated by emitting X rays from the first surface 10A side of the base 10, is acquired, the acquired X-ray image is analyzed, and the amount of protrusion D of the partition 6 (i.e., the length from the side surface of the lower portion 61 to the end portion of the upper portion 62) is measured based on the analysis result.

In the embodiment, since the display device DSP can be manufactured by measuring the amount of protrusion D of the partition 6 (i.e., confirming whether or not the amount of protrusion D of the partition 6 is appropriate), by the above-described configuration, reduction in reliability of the display device DSP can be suppressed.

The X-ray image generated by the image generation device 200 is an X-Y plane image as described above, and the side surface of the lower portion 61 and the end portion of the upper portion 62 of the partition 6 are included in the X-ray image. For this reason, for example, it is possible to measure the amount of protrusion D of the partition 6 by manually designating the side surface of the lower portion 61 and the end portion of the upper portion 62 (i.e., to manually measure the partition 6 with reference to the X-ray image).

However, since the luminance value (pixel value) of each of a plurality of pixels constituting the X-ray image is based on the intensity of X rays passing through the partition 6, the base 10, and the like as described above, the partition 6 included in the X-ray image is unclear depending on the X-ray image (i.e., the side surface of the lower portion 61 and the end portion of the upper portion 62 can hardly be visually recognized), much labor is required to manually measure the above-described amount of protrusion D of the partition 6, and efficient measurement of the amount of protrusion D of the partition 6 in a process of manufacturing the display device DSP cannot be implemented.

In contrast, in the embodiment, the first pixel corresponding to (the end portion on the base 10 side of) the side surface of the lower portion 61 and the second pixel corresponding to the end portion of the shadow of the upper portion 62 are identified based on the luminance values of the plurality of pixels constituting the X-ray image, and the amount of protrusion D of the partition 6 is measured based on the number of pixels arranged between the identified first and second pixels. In the embodiment, with such a configuration, since the amount of protrusion D of the partition 6 can be automatically measured based on, for example, the X-ray image including the partition 6, which is generated by emitting X rays, labor for the measurement of the amount of protrusion D can be reduced.

In the embodiment, the amount of protrusion D of the partition 6 may be measured based on the number of pixels arranged between the first and second pixels identified from the X-ray image, but the amount of protrusion D of the partition 6 can be measured using, for example, the conversion information or the machine learning model. In this case, the conversion information may be prepared in advance, based on, for example, the X-ray image (second image) including the sample whose size is already known, which is generated by emitting X rays. In addition, the machine learning model may be prepared in advance (generated) by learning a data set including both the number of pixels arranged between the first and second pixels identified from the X-ray image (third image) including the partition 6 (sample) whose amount of protrusion D is already known, which is generated by emitting X rays, and the known amount of protrusion D (measured value).

In addition, in the embodiment, it has been described that the amount of protrusion D of the partition 6 is measured by executing the process shown in FIG. 13 but, for example, a machine learning model learning a data set including both the X-ray image including the partition 6 (sample) whose amount of protrusion D is already known and the known amount of protrusion D of the partition 6 may be prepared. According to such a configuration, for example, the measuring device 300 can acquire the amount of protrusion D of the partition 6 output from the machine learning model (i.e., predict the amount of protrusion D of the partition 6 included in the X-ray image from the X-ray image) by inputting the X-ray image generated by the image generation device 200 to the machine learning model.

Incidentally, in the embodiment, it has been described that the X-ray image is generated by emitting X rays from the X-ray emitter 201 arranged on the first surface 10A side of the base 10 and detecting X rays passing through the partition 6, the base 10, and the like with the X-ray detector 202 arranged on the second surface 10B side of the base 10 (i.e., based on the intensity of X rays passing through the partition 6, the base 10, and the like from the first surface 10A side of the base 10 toward the second surface 10B side), but the X-ray image may be generated emitting X rays from the X-ray emitter 201 arranged on the second surface 10B side of the base 10 and detecting X rays passing through the base 10 and the like and the partition 6 with the X-ray detector 202 arranged on the first surface 10A side. In other words, in the embodiment, X rays may be emitted from the X-ray emitter 201 arranged on one of the first surface 10A side and the second surface 10B side of the base 10 and may be detected by the X-ray detector 202 arranged on the other of the first surface 10A side and the second surface 10B side of the base 10.

Furthermore, in the embodiment, it has been described that the amount of protrusion D of the partition 6 is measured based on the X-ray image including the partition 6, which is generated by emitting X rays, but the X rays are examples and, for example, the embodiment may be configured to measure the amount of protrusion D of the partition 6, based on the image (transmission light image) including the partition 6, which is generated by emitting electromagnetic waves different in transmittance depending on the material, thickness or the like of the object. Examples of the electromagnetic waves other than X rays emitted toward the partition 6 (i.e., electromagnetic waves used to generate the image) in the embodiment include, for example, infrared rays and the like.

In addition, it has been described that the amount of protrusion D of the partition 6 is measured using the image generated based on the intensity of X rays (electromagnetic waves) passing through the partition 6, the base 10, and the like in the embodiment but, for example, when infrared rays or the like are used as the electromagnetic waves, the amount of protrusion D of the partition 6 may be measured using the image generated based on the intensity of the electromagnetic waves (reflected wave) reflected on the partition 6 and the base 10. In this case, the electromagnetic waves may be emitted from an emitter (electromagnetic wave emitter) arranged on the first surface 10A side or the second surface 10B side of the base 10, and may be detected by a detector (electromagnetic wave detector) arranged on the same surface side as the emitter, of the first surface 10A and the second surface 10B of the base 10.

More specifically, when the electromagnetic wave emitter emits electromagnetic waves from the first surface 10A side of the base 10, the electromagnetic wave detector can detect the electromagnetic waves (reflected waves) reflected on the surface of the partition 6 (i.e., the surface of the upper portion 62 on the direction Z side). In addition, for example, since (parts of) the electromagnetic waves pass through the upper portion 62 included in the partition 6, the electromagnetic wave detector detects the electromagnetic waves (reflected waves) passing through the upper portion 62 and reflected on an interface between the lower portion 61 and the upper portion 62. It has been described that the electromagnetic waves are reflected on the interface between the lower portion 61 and the upper portion 62 but, for example, the electromagnetic waves are also reflected on an interface between the lower portion 61 and the rib 5 or the like in the same manner, and the electromagnetic wave detector detects the reflected waves. According to the reflected waves of the electromagnetic waves thus detected by the electromagnetic detector, for example, since the X-Y plane image or X-Z plane image (cross-sectional image) including the partition 6 can be generated, the amount of protrusion D of the partition 6 can be measured based on the image.

All measuring methods and measuring devices, which are implementable with arbitrary changes in design by a person of ordinary skill in the art based on the measuring methods and measuring devices described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A measuring method comprising:

forming a partition including a lower portion arranged on a first surface side of a base and an upper portion protruding from a side surface of the lower portion;

acquiring a first image including the partition, which is generated by emitting electromagnetic waves from the first surface side of the base or a second surface side opposed to the first surface of the base;

analyzing the acquired first image; and measuring an amount of protrusion at which an end portion of the upper portion protrudes from the side surface of the lower portion, based on the analysis result.

2. The measuring method of claim 1, wherein the analyzing includes identifying a first pixel corresponding to the side surface of the lower portion and a second pixel corresponding to the end portion of the upper portion, based on luminance values of a plurality of pixels constituting the first image, and the measuring includes measuring the amount of protrusion, based on the number of pixels arranged between the identified first and second pixels.

3. The measuring method of claim 2, wherein the measuring includes converting the number of pixels into the amount of protrusion, based on conversion information indicating a length corresponding to one pixel, and the conversion information is prepared in advance, based on a second image including a sample whose size is already known, which is generated by emitting the electromagnetic waves.

4. The measuring method of claim 2, wherein the measuring includes acquiring the amount of protrusion output from a machine learning model by inputting the number of pixels arranged between the identified first and second pixels to the machine learning model, the machine learning model being generated by learning a data set prepared in advance, and the data set includes the number of pixels arranged between the first and second pixels identified from a third image including the partition in which the amount of protrusion is already known, which is generated by emitting the electromagnetic waves, and the known amount of protrusion.

5. The measuring method of claim 1, wherein the first image is generated based on an intensity of the electromagnetic waves passing through the base and the partition, and the electromagnetic waves are emitted from an emitter arranged on one of the first and second surface sides of the base, and are detected by a detector arranged on the other of the first and second surface sides of the base.

6. The measuring method of claim 5, wherein the electromagnetic waves are X rays.

7. The measuring method of claim 1, wherein the first image is generated based on an intensity of the electromagnetic waves reflected on the base and the partition, the electromagnetic waves are emitted from an emitter arranged on a first or second surface side of the base, and the electromagnetic waves reflected on the partition and the base are detected by a detector arranged on the same surface side as the emitter, of the first and second surface sides of the base.

8. A measuring device comprising:

an acquisition unit configured to acquire a first image including a partition, which is generated by emitting electromagnetic waves from a first surface side of a base in which the partition including a lower portion and an upper portion protruding from a side surface of the lower portion is formed on the first surface side, or a second surface side opposed to the first surface of the base;

an analysis unit configured to analyze the acquired first image; and a measuring unit configured to measure an amount of protrusion at which an end portion of the upper portion protrudes from the side surface of the lower portion, based on the analysis result.

9. The measuring device of claim 8, wherein the analysis unit is configured to identify a first pixel corresponding to the side surface of the lower portion and a second pixel corresponding to the end portion of the upper portion, based on luminance values of a plurality of pixels constituting the first image, and the measuring unit is configured to measure the amount of protrusion, based on the number of pixels arranged between the identified first and second pixels.

10. The measuring device of claim 9, wherein the measuring unit is configured to convert the number of pixels into the amount of protrusion, based on conversion information indicating a length corresponding to one pixel, and the conversion information is prepared in advance, based on a second image including a sample whose size is already known, which is generated by emitting the electromagnetic waves.

11. The measuring device of claim 9, wherein the measuring unit is configured to acquire the amount of protrusion output from a machine learning model by inputting the number of pixels arranged between the identified first and second pixels to the machine learning model, the machine learning model being generated by learning a data set prepared in advance, and the data set includes the number of pixels arranged between the first and second pixels identified from a third image including the partition in which the amount of protrusion is already known, which is generated by emitting the electromagnetic waves, and the known amount of protrusion.

12. The measuring device of claim 8, wherein the first image is generated based on an intensity of the electromagnetic waves passing through the base and the partition, and the electromagnetic waves are emitted from an emitter arranged on one of the first and second surface sides of the base, and are detected by a detector arranged on the other of the first and second surface sides of the base.

13. The measuring device of claim 12, wherein the electromagnetic waves are X rays.

14. The measuring device of claim 8, wherein the first image is generated based on an intensity of the electromagnetic waves reflected on the base and the partition, the electromagnetic waves are emitted from an emitter arranged on a first or second surface side of the base, and the electromagnetic waves reflected on the partition and the base are detected by a detector arranged on the same surface side as the emitter, of the first and second surface sides of the base.

15. A measuring device comprising:

an emitting unit emitting electromagnetic waves from a first surface side of a base in which a partition including a lower portion and an upper portion protruding from a side surface of the lower portion is formed on the first surface side, or a second surface side opposed to the first surface of the base;

a detecting unit configured to detect the emitted electromagnetic waves;

an acquisition unit configured to acquire a first image generated based on an intensity of the detected electromagnetic waves;

an analysis unit configured to analyze the acquired first image; and a measuring unit configured to measure an amount of protrusion at which an end portion of the upper portion protrudes from the side surface of the lower portion, based on the analysis result.

16. The measuring device of claim 15, wherein the analysis unit is configured to identify a first pixel corresponding to the side surface of the lower portion and a second pixel corresponding to the end portion of the upper portion, based on luminance values of a plurality of pixels constituting the first image, and the measuring unit is configured to measure the amount of protrusion, based on the number of pixels arranged between the identified first and second pixels.

17. The measuring device of claim 16, wherein the measuring unit is configured to convert the number of pixels into the amount of protrusion, based on conversion information indicating a length corresponding to one pixel, and the conversion information is prepared in advance, based on a second image including a sample whose size is already known, which is generated by emitting the electromagnetic waves.

18. The measuring device of claim 16, wherein the measuring unit is configured to acquire the amount of protrusion output from a machine learning model by inputting the number of pixels arranged between the identified first and second pixels to the machine learning model, the machine learning model being generated by learning a data set prepared in advance, and the data set includes the number of pixels arranged between the first and second pixels identified from a third image including the partition in which the amount of protrusion is already known, which is generated by emitting the electromagnetic waves, and the known amount of protrusion.

19. The measuring device of claim 15, wherein the first image is generated based on an intensity of the electromagnetic waves passing through the base and the partition, and the electromagnetic waves are emitted from the emitting unit arranged on one of the first and second surface sides of the base, and are detected by the detecting unit arranged on the other of the first and second surface sides of the base.

20. The measuring device of claim 19, wherein the electromagnetic waves are X rays.

* * * * *